United States Patent
Elder et al.

(10) Patent No.: US 9,223,811 B2
(45) Date of Patent: Dec. 29, 2015

(54) CREATION AND EXPIRATION OF BACKUP OBJECTS IN BLOCK-LEVEL INCREMENTAL-FOREVER BACKUP SYSTEMS

(75) Inventors: Robert S. Elder, Tucson, AZ (US); Avishai H. Hochberg, San Jose, CA (US); Eran Raichstein, Yokneam Ilit (IL); Michael Sternberg, Haifa (IL); David G. Van Hise, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 234 days.

(21) Appl. No.: 13/484,312

(22) Filed: May 31, 2012

(65) Prior Publication Data
US 2013/0325810 A1 Dec. 5, 2013

(51) Int. Cl.
*G06F 17/30* (2006.01)

(52) U.S. Cl.
CPC .............................. *G06F 17/30309* (2013.01)

(58) Field of Classification Search
CPC ............ G06F 11/1451; G06F 11/1458; G06F 11/1435; G06F 11/1448; G06F 17/30345; G06F 2201/84; G06F 11/1453; G06F 11/2094; G06F 3/0641; G06F 17/30309; G06F 11/25094; Y10S 707/99955
USPC ........................................................ 707/645
See application file for complete search history.

(56) References Cited

U.S. PATENT DOCUMENTS

| | | | |
|---|---|---|---|
| 6,857,053 B2 | 2/2005 | Bolik et al. | |
| 7,240,171 B2 | 7/2007 | Barton et al. | |
| 7,797,279 B1 * | 9/2010 | Starling et al. | 707/641 |
| 7,873,601 B1 | 1/2011 | Kushwah | |
| 8,200,637 B1 * | 6/2012 | Stringham | 707/670 |
| 8,433,863 B1 * | 4/2013 | Orcutt | 711/162 |
| 2004/0030852 A1 * | 2/2004 | Coombs et al. | 711/162 |
| 2008/0275923 A1 | 11/2008 | Haselton et al. | |
| 2010/0312751 A1 * | 12/2010 | Anglin et al. | 707/638 |
| 2012/0030260 A1 * | 2/2012 | Lu et al. | 707/820 |
| 2012/0079502 A1 * | 3/2012 | Kwan et al. | 718/106 |
| 2013/0110784 A1 * | 5/2013 | Guo et al. | 707/649 |

OTHER PUBLICATIONS

U.S. Appl. No. 12/972,307, entitled "Restoring Deduplicated Data Objects From Sequential Backup Devices" filed Dec. 17, 2010.

* cited by examiner

*Primary Examiner* — Jean B Fleurantin
*Assistant Examiner* — Evan Aspinwall
(74) *Attorney, Agent, or Firm* — Stephen R. Yoder; Noah A. Sharkan

(57) ABSTRACT

Embodiments of the present invention provide a scalable, efficient way to backup data in a block-level incremental-forever backup system such that backup and expiration of data can be achieved at the granularity of a single backup version, without having to read or move data that is stored in backup storage.

15 Claims, 9 Drawing Sheets

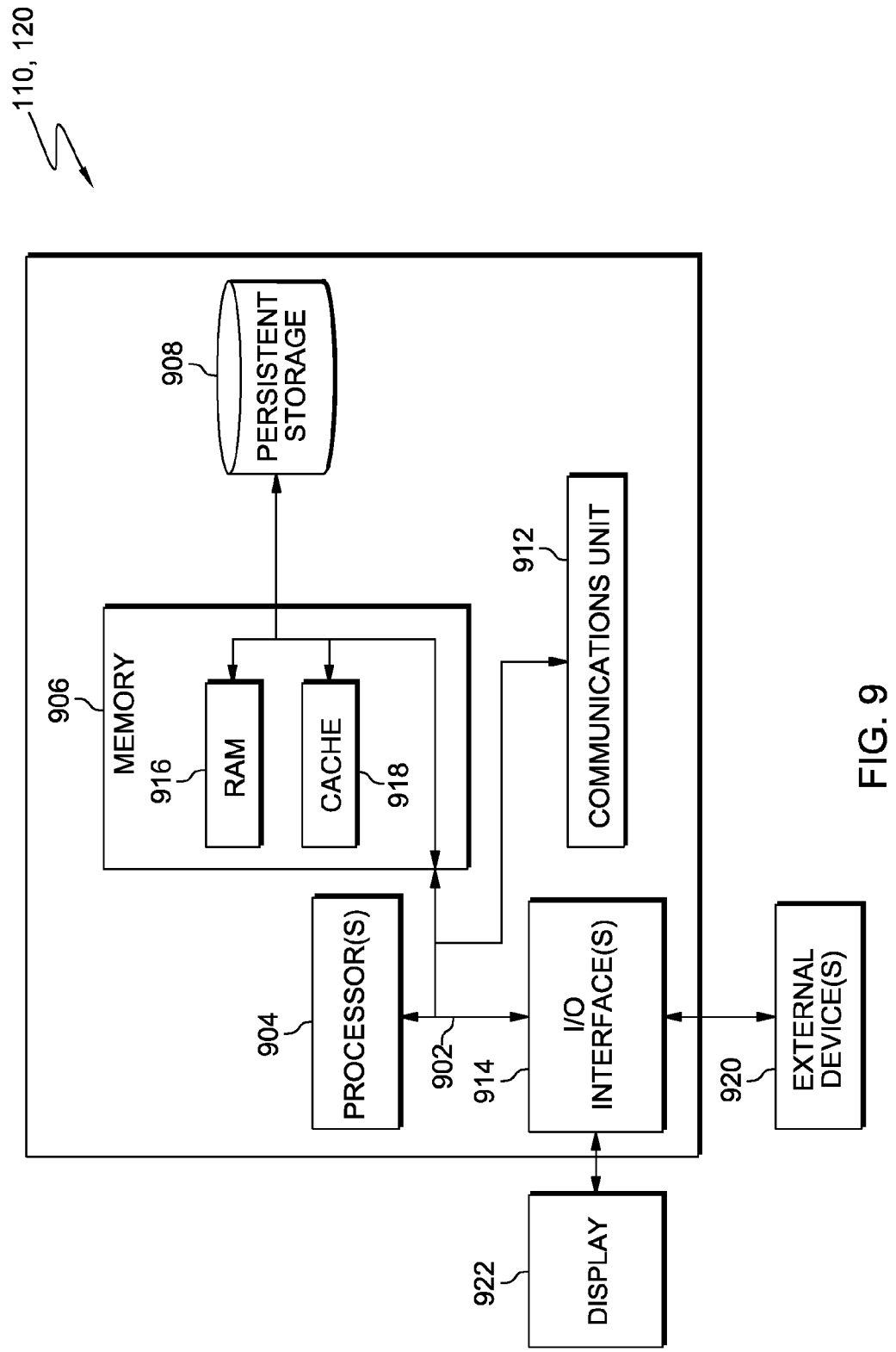

CREATION AND EXPIRATION OF BACKUP OBJECTS IN BLOCK-LEVEL INCREMENTAL-FOREVER BACKUP SYSTEMS

FIELD OF THE INVENTION

The present invention relates generally to data backup systems and, more particularly, to creating and expiring backup objects in block-level incremental-forever backup systems.

BACKGROUND

Data backup systems enable a client computer system to back up data to a server over a network. The backed-up data transmitted to the server can be stored in backup storage as backup objects, from which it can later be retrieved and restored on the client computer system. Often, data backup systems are configured to maintain a limited number of backup versions (e.g., pursuant to a data expiration policy), and old backup versions are expired after newer backup versions have been created.

Block-level incremental-forever backup technology involves creating an initial full backup version of the client computer system's data as blocks of raw data, followed by incremental backup versions of data that has changed since the prior backup. A complete restoration of the client computer system's data can therefore require using data from an initial full backup version and one or more incremental backup versions. Because a backup version can depend on other backup versions, when expiring old data, block-level incremental-forever back-up systems typically utilize an expiration process to ensure that data needed for a complete restoration is retained.

One such expiration process involves combining old backup versions to consolidate data that is to be retained, while expiring unneeded data. This technique requires reading data from backup storage and can therefore limit the backup storage media that can be used. For example, this technique can be used with fast, random-access backup storage media (e.g., hard disk drives), but is not well-suited for use with sequential-access backup storage media (e.g., tape drives) and backup storage media with slow access times. The process of reading data from backup storage and consolidating valid data can also consume additional backup server resources. Further, the consumption of backup server resources typically increases with larger amounts of client system data and backup storage space, which can limit the scalability of the data backup system.

Another expiration process involves expiring a full backup version along with its dependent incremental backup versions. While this technique can avoid having to read and consolidate data stored in backup storage, it requires periodically creating full backup versions, as opposed to creating a single, initial full backup version. Creating periodic full backups can consume additional storage space, additional bandwidth, and additional client system and backup server resources. Further, expiration is not achieved with the granularity of a single backup version, as multiple backup versions are expired together. Again, these effects can limit the scalability of the data backup system.

SUMMARY

Embodiments of the present invention provide a system, method, and program product for creating backup objects in a block-level incremental-forever backup system such that the number of backup objects that must be maintained and tracked for the purposes of restoring or expiring backup versions can be optimized to achieve efficiency and scalability of the backup system.

In one embodiment of the present invention, a computer system, during a full backup of a storage medium, divides the storage medium into logical regions and subregions. During an incremental backup of the storage medium, the computer system determines whether one or more subregions of a logical region contain data that has changed since a most recent prior backup. If one or more subregions of the logical region do contain data that has changed since the most recent prior backup, the computer system, based on one or more heuristics, copies either all data contained in the logical region, or all data contained in the one or more subregions of the logical region that contain data that has changed since the most recent prior backup. The computer system then creates a backup object that contains the copied data.

BRIEF DESCRIPTION OF THE SEVERAL VIEWS OF THE DRAWINGS

FIG. 9 is a block diagram of internal and external components of the computer systems of FIG. 1 in accordance with an embodiment of the present invention.

DETAILED DESCRIPTION

Briefly, disclosed is an efficient, scalable way to back up data in a block-level incremental-forever backup system such that backup and expiration of data can be achieved at the granularity of a single backup version, without the need for reading data from backup storage or moving data on backup storage.

During an initial full backup operation, the storage medium containing data that is to be backed up is logically divided into finite regions using at least two levels of granularity. During subsequent incremental backup operations, the extent to which data is copied from the regions to create backup objects is based on one or more heuristics. The one or more heuristics are implemented with one or more algorithms that can be configured to optimize the number of backup objects that are created, maintained, and tracked for the purposes of later restoring or expiring backup versions, which can reduce the amount of system resources consumed when performing these operations and scaling up the backup system. Further, because backup and expiration of backup versions does not require reading data from backup storage or moving data on backup storage, sequential-access storage media and storage media with slow access times can be used.

Embodiments of the present invention will now be described in detail with reference to the accompanying drawings.

Figure 1:
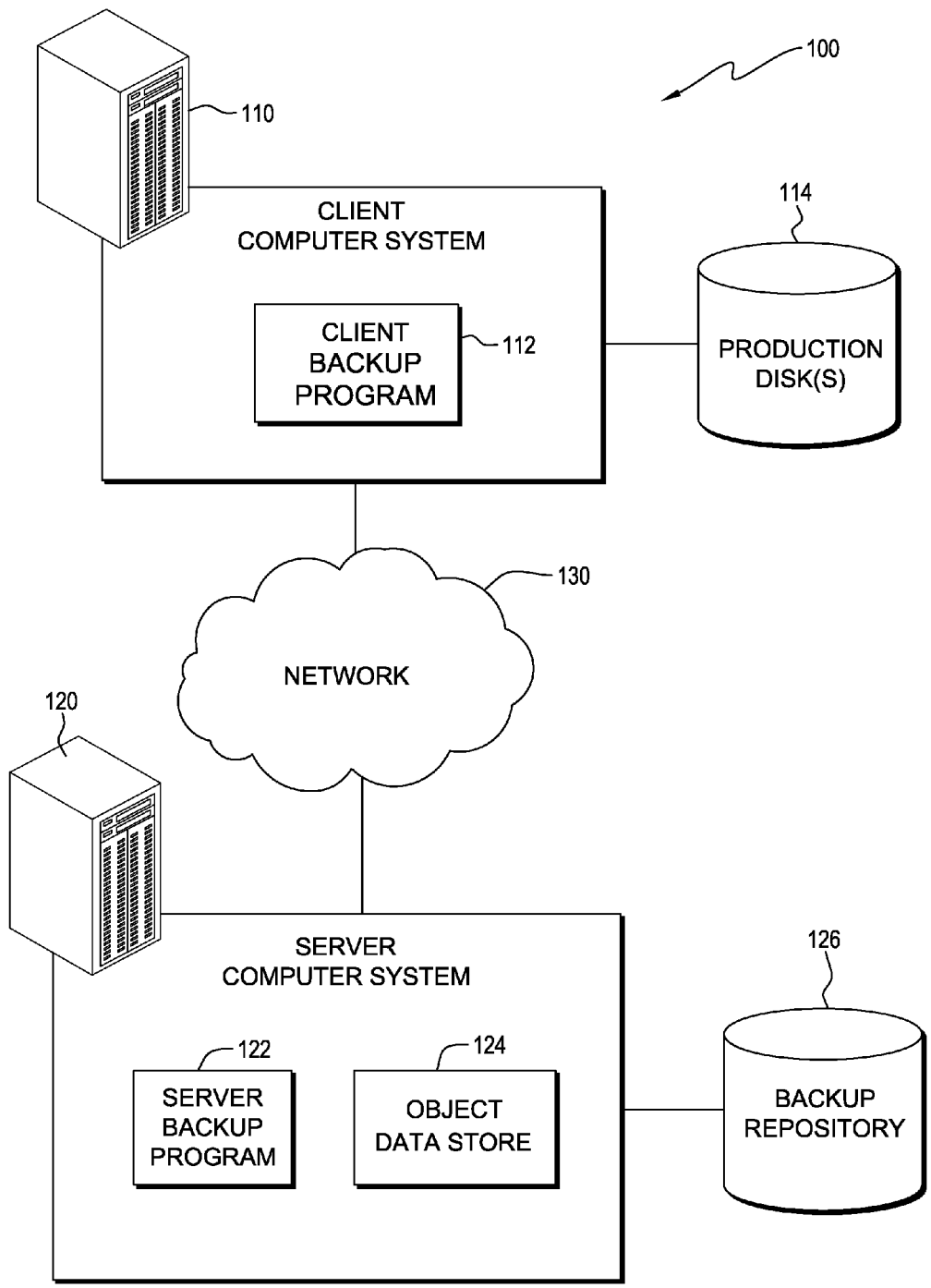
FIG. 1 is a block diagram of a backup system in accordance with an embodiment of the present invention.

FIG. 1 is a functional block diagram of a backup system 100 in accordance with an embodiment of the present invention. Backup system 100 includes client computer system 110 and server computer system 120 interconnected by network 130. Client computer system 110 and server computer system 120 can be desktop computers, laptop computers, specialized computer servers, or any other computer systems known in the art. In certain embodiments, client computer system 110 and server computer system 120 represent computer systems utilizing clustered computers and components to act as a single pool of seamless resources when accessed through network 130. For example, such embodiments may be used in a datacenter, cloud computing, storage area network (SAN), and network attached storage (NAS) applications. In certain embodiments, client computer system 110 and server computer system 120 represent virtual machines. In general, client computer system 110 and server computer system 120 are representative of any electronic devices or combination of electronic devices capable of executing machine-readable program instructions, as described in greater detail with regard to FIG. 9.

Client computer system 110 includes client backup program 112 and one or more production disks 114. Client backup program 112 performs client-side operations to backup data stored on one or more production disks 114 ("production data") in accordance with embodiments of the present invention, as described in greater detail with regard to FIGS. 2 through 8. During certain backup operations, client backup program 112 creates backup objects and transmits those backup objects to server computer system 120. Client backup program 112 is also capable of later utilizing backup objects received from server computer system 120 to restore production data on one or more production disks 114.

One or more production disks 114 may be, for example, one or more Advanced Technology Attachment (ATA), Serial ATA (SATA), Small Computer System Interface (SCSI), or Serial Attached SCSI (SAS) compatible hard disk drives. One or more production disks 114 may be implemented with a plurality of such hard disk drives in different configurations, such as, for example, as independent hard disk drives or as a plurality of hard disk drives in a redundant array of independent disks (RAID). One or more production disks 114 can also have one or more logical volumes in different configurations. For example, a hard disk drive can contain a single logical volume or multiple logical volumes, or a single logical volume can span multiple hard disk drives. Hereinafter, for purposes of explanation, embodiments of the present invention will be discussed with regard to a single production disk 114 implemented with a single hard disk drive. In general, however, one or more production disks 114 can be implemented with any storage media known in the art.

Server computer system 120 includes server backup program 122, object data store 124, and backup repository 126. Server backup program 122 performs server-side backup operations to backup production data stored on production disk 114 in accordance with embodiments of the present invention. During certain backup operations, server backup program 122 creates entries in object data store 124 and stores the backup objects received from client backup program 112 in backup repository 126. Server backup program 122 also performs expiration processes.

Object data store 124 is utilized by server backup program 122 to maintain searchable backup object entries for each backup object stored in backup repository 126 and group leader entries for each backup version. Group leader entries are utilized to group together all backup object entries that are associated with a given backup version of production disk 114. Accordingly, group leader entries enable server backup program 122 to identify all backup objects that are needed to restore a particular backup version and, similarly, all backup objects that might be deleted upon expiration of the backup version at a later point in time. Further, backup object entries can be associated with multiple group leaders in object data store 124, thereby enabling server backup program 122 to maintain multiple backup versions that share common backup objects without having to store multiple copies of the those backup objects in backup repository 126. Object data store 124 can be implemented using any database architecture known in the art, such as, for example, a relational database, an object-oriented database, and/or one or more tables.

Backup repository 126, in which server backup program 122 stores the backup objects received from client backup program 112, can be implemented using any non-volatile storage media known in the art. For example, backup repository 126 can be implemented with a tape library, optical library, one or more independent hard disk drives, or multiple hard disk drives in a redundant array of independent disks (RAID).

Network 130 can be, for example, a local area network (LAN), a wide area network (WAN) such as the Internet, or a combination of the two, and include wired, wireless, or fiber optic connections. In general, network 130 can be any combination of connections and protocols that will support communications between client computer system 110 and server computer system 120 in accordance with a desired embodiment of the invention.

It should be understood that, for illustrative purposes, FIG. 1 does not show other computer systems and elements which may be present when implementing embodiments of the present invention. For example, while FIG. 1 shows a single client computer system 110, backup system 100 can also include additional client computer systems 110 that utilize server computing system 120 to backup their respective production data.

Figure 2:
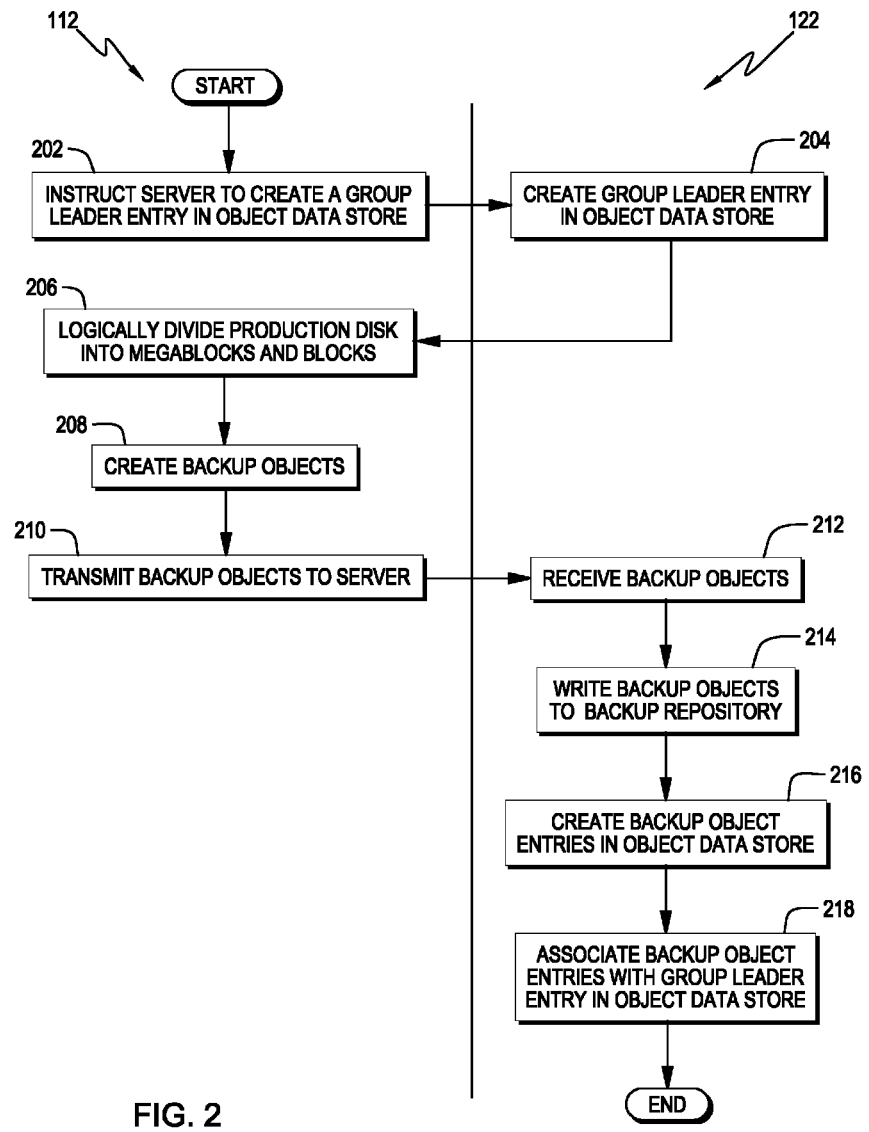
FIG. 2 is a flowchart illustrating operational steps for performing a full backup in accordance with an embodiment of the present invention.

FIG. 2 is a flowchart illustrating operational steps that client backup program 112 and server backup program 122 perform during an initial full backup of production disk 114 in accordance with an embodiment of the present invention.

In step 202, client backup program 112 transmits instructions to server backup program 122 via network 130 to create a group leader entry in object data store 124. In step 204, server backup program 122 receives the instructions, creates a group leader entry for the present backup version in object data store 124, and transmits a confirmation to client backup program 112 to indicate that the group leader entry has been created.

In one embodiment of the present invention, the group leader entry contains an identifier for the group leader (e.g., a unique name or code), an associated backup object entries field in which identifiers for associated backup object entries can later be added (in step 218), and information pertaining to any specified expiration policies. Regarding expiration policies, an administrative user of backup system 100 can specify one or more expiration policies that control when the group leader entry should expire, if at all. For example, an administrative user wishing to maintain three backup versions (i.e., generations) of production disk 114 can specify that the group leader entry should expire after three subsequent backup versions have been created.

In step 206, client backup program 112 logically divides production disk 114 into megablocks and blocks. The terms "megablock" and "block", as used in this specification, refer to finite regions of production disk 114. The megablocks and blocks established during the initial full backup will remain the same for subsequent incremental backups of production disk 114.

In one embodiment, each megablock corresponds to a 128 megabyte region of production disk 114, and each block corresponds to a 16 kilobyte region within a megablock. Thus, in this embodiment, each megablock includes 8192 blocks and can contain up to 128 megabytes of production data. In other embodiments, megablocks and blocks can have different sizes, as specified by an administrative user of backup system 100. In other embodiments, client backup program 112 can further divide production disk 114 beyond megablocks and blocks to achieve more levels of granularity.

In step 208, client backup program 112 creates several backup objects. In this exemplary embodiment of the present invention, the backup objects created by client backup program 112 are one or more megablock data files, one or more control files, and a bitmap file.

A megablock data file contains blocks of production data from a particular megablock. During this initial full backup, client backup program 112 creates a megablock data file for each megablock on production disk 114 whose blocks contain production data.

A control file describes the structure of a particular megablock using a control file record (i.e., pointer) for each block within the megablock. For example, if a block is to be backed up, the control file record points to the appropriate block of production data in the appropriate megablock data file; if a given block is not to be backed up (e.g., that region of production disk 114 does not contain production data at the time of the initial full backup), the control file record for that block will have a null value. Client backup program 112 creates a control file for each megablock on production disk 114.

A bitmap file describes the overall structure of production data on production disk 114. The bitmap file contains a bitmap record (i.e., a pointer) for each control file. If a given megablock is not to be backed up, the bitmap record for that megablock's control file will have a null value.

Accordingly, the backup objects created by client backup program 112, together, contain the necessary information for client backup program 112 to later restore production disk 114. While this exemplary embodiment utilizes a bitmap file, control files, and megablock data files, other embodiments of the present invention can utilize different types of backup objects.

In step 210, client backup program 112 transmits the backup objects to server backup program 122 via network 130. In step 212, server backup program 122 receives the backup objects and, in step 214, server backup program 122 writes the backup objects to backup repository 126.

In step 216, server backup program 122 creates a backup object entry in object data store 124 for each of the backup objects written to backup repository 126 in step 214. In one embodiment of the present invention, each backup object entry contains an identifier for the backup object entry (e.g., a unique name or code), the storage location of the corresponding backup object in backup repository 126, and an associated group leader entries field in which identifiers for associated group leader entries can be added (in step 218).

In step 218, server backup program 122 associates the backup object entries and the group leader entry in object data store 124. Server backup program 122 adds the identifiers for each of the backup object entries created in step 216 to the associated backup object entries field of the group leader entry created in step 204, and server backup program 122 also adds the identifier for the group leader entry to the associated group leader entries field of each of the backup object entries. Thus, after step 218, server backup program 122 can identify all backup objects that are associated with the backup version by accessing the group leader entry in object data store 124, which contains references to the associated backup object entries.

Figure 3:
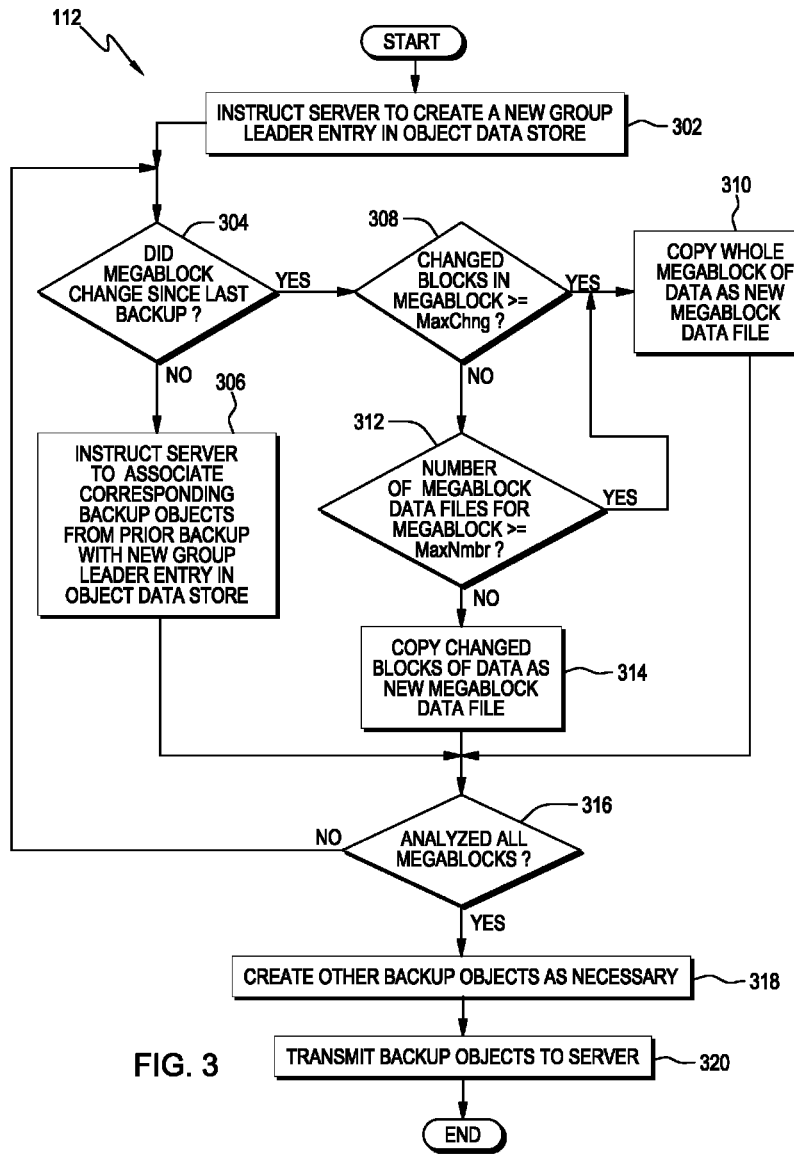
FIG. 3 is a flowchart illustrating operational steps for performing an incremental backup in accordance with an embodiment of the present invention.

FIG. 3 is a flowchart illustrating operational steps that client backup program 112 performs during an incremental backup of production disk 114 in accordance with an embodiment of the present invention. In this exemplary embodiment, the incremental backup is performed after a full backup has been performed in accordance with the operational steps of FIG. 2.

In step 302, client backup program 112 transmits instructions to server backup program 122 via network 130 to create a new group leader entry in object data store 124, after which server backup program 122 creates a new group leader entry for this backup version.

In step 304, client backup program 112 determines whether the production data within a first megablock has changed since the last backup. That is, for a first megablock, client backup program 112 determines whether the production data within the blocks of that megablock has changed since the last backup operation was performed. For example, such a change can be the result of writing data to, or deleting data from, production disk 114 since the initial full backup was performed.

If client backup program 112 determines that the production data within the first megablock has not changed since the last backup operation was performed, then, in step 306, client backup program 112 instructs server backup program 122 to associate the first megablock's corresponding backup object entries from the prior backup version (i.e., the backup object entries for the megablock's megablock data file and control file) with the new group leader entry that was created in object data store 124. For example, because the first megablock's backup objects are already stored in backup repository 126 and the first megablock has not changed (i.e., the data needed to restore the megablock is already backed up), client backup program 112 does not recopy that production data from production disk 114 and create a new megablock data file and control file; instead, client backup program 112 may instruct server backup program 122 to associate those existing backup objects with the present backup version as well (i.e., add the identifier for each of those backup entries to the associated backup object entries field of the new group leader entry, and add the identifier for the new group leader entry to the associated group leader entries field of each of those backup object entries).

If, in step 304, client backup program 112 determines that the production data within the first megablock has changed since the last backup operation was performed, then client backup program 112 utilizes one or more heuristics (e.g., the algorithms of steps 308 and 312) to control the extent to which production data within the first megablock is copied from production disk 114 as a new megablock data file to be stored on backup repository 126.

In step 308, client backup program 112 determines whether the percentage of blocks within the first megablock that contain changed production data ("changed blocks") is greater than or equal to a specified maximum percentage (MaxChng). The maximum percentage can be specified by an administrative user of backup system 100. For example, if the specified maximum percentage is 50 percent and the first megablock includes 8192 blocks total, client backup program 112 would determine whether the number of changed blocks within the first megablock is greater than or equal to 4096.

If client backup program 112 determines that the percentage of changed blocks is greater than or equal to the specified maximum percentage, then, in step 310, client backup program 112 copies all blocks of production data within the first megablock and creates a new megablock data file. For example, if out of the 8192 total blocks within the first megablock there are 5000 changed blocks and 1000 blocks that contain production data that has not changed, then client backup program 112 would copy all 6000 blocks of production data from production disk 114 and create a new megablock data file.

If, in step 308, client backup program 112 determines that the percentage of changed blocks is less than the specified maximum percentage, then, in step 312, client backup program 112 determines whether the number of megablock data files for the first megablock that exist in the prior backup version is greater than or equal to a specified maximum number (MaxNmbr). Stated differently, in step 312, client backup program 112 determines whether the number of megablock data files already being maintained and tracked for the first megablock (i.e., as a result of prior backup operations) is greater than or equal to the specified maximum number. As with the specified maximum percentage, the specified maximum number of existing megablock data files can be specified by an administrative user of backup system 100. Client backup program 112 can identify existing megablock data files by maintaining and querying a local record of existing megablock data files or by instructing server backup program 122 to query object data store 124.

If, in step 312, client backup program 112 determines that the number of existing megablock data files for the first megablock is greater than or equal to the specified maximum number, then, in step 310, client backup program 112 copies from production disk 114 all blocks of production data within the first megablock and creates a new megablock data file, as previously discussed.

If, in step 312, client backup program 112 determines that the number of existing megablock data files for the first megablock is less than the specified maximum number, then, in step 314, client backup program 112 copies from production disk 114 only the changed blocks of production data and creates a new megablock data file. For example, if out of the 8192 total blocks within the first megablock there are 1000 changed blocks and 1000 blocks that contain production data that has not changed, client backup program 112 would copy only the 1000 changed blocks of production data and create a new megablock data file.

After step 306, step 310, or step 314 is performed, analysis of the first megablock is completed and, in step 316, client backup program 112 determines whether all megablocks have been analyzed. If client backup program 112 determines that all megablocks have not been analyzed, then the operational steps repeat back at step 304 for another megablock, and so repeat for all megablocks on production disk 114.

If, in step 316, client backup program 112 determines that all megablocks have been analyzed, then, in step 318, client backup program 112 creates a bitmap file and one or more control files as necessary. For example, for each megablock for which a megablock data file was created in step 310, client backup program 112 creates a control file referencing that megablock data file. For each megablock for which a megablock data file was created in step 314 (i.e., a megablock data file containing only changed blocks), client backup program 112 creates a control file that references both the newly created megablock data file and the one or more megablock data files for that megablock that existed in the prior backup version (i.e., some of the control file records will reference the changed blocks within the newly created megablock data file, while other control file records will reference the unchanged blocks within the mega block data files that existed in the prior backup version).

In step 320, client backup program 112 transmits all of the backup objects (i.e., the bitmap file, and any newly created megablock data files and control files) to server backup program 122. As previously discussed with regard to FIG. 2, after receiving the backup objects, server backup program 122 writes the backup objects to backup repository 126, creates backup object entries in object data store 124, and associates the backup object entries with the new group leader entry. In addition, for each megablock for which a megablock data file was created in step 314 (i.e., a megablock data file containing only changed blocks), server backup program 122 associates the megablock data files for that megablock that existed in the prior backup version with the new group leader entry.

Accordingly, incremental backups are achieved with the granularity of a single backup version, while also managing the number of backup objects that must be maintained and tracked for the purposes of later restoring or expiring a backup version. Each backup version references all associated backup objects, and multiple backup versions can share common backup objects without having to store multiple copies of those backup objects in backup repository 126.

Backup operations performed in accordance with embodiments of the present invention also do not require reading data from backup repository 126, which enables the use of sequential-access storage media in backup repository 126 and can decrease the amount of resources expended by server computing system 120 when scaling up the size of production disk 114 and backup repository 126.

The specified heuristics discussed in this exemplary embodiment can be adjusted, and additional heuristics can be added, in order to optimize the number of backup objects being created and further decrease the amount of resources expended by server computer system 120 when scaling up the size of production disk 114 and backup repository 126. For example, minimizing the number of backup objects that are created and maintained for a particular backup version can potentially yield much greater system performance during restoration of the backup version, as fewer backup objects must be retrieved from backup repository 126 and transmitted to client computer system 110. Embodiments of the present invention can also utilize a single heuristic, such as, for example, only performing step 308 or 312, as opposed to both.

Additional heuristics can also be added to create new megablock data files for megablocks whose production data has remained unchanged for a specified period of time, which can help ensure that backup objects needed to restore a particular backup version are stored relatively near one another on backup repository 126. For example, in one embodiment of the present invention, for each megablock, client backup program 112 also determines whether data within the megablock has changed since a specified number of backups. If the data has not changed since the specified number of backups, client backup program 112 copies from production disk 114 all blocks of production data within the megablock and creates a new megablock data file; if the data has changed since the specified number of backups, client backup program 112 copies from production disk 114 only the changed blocks of production data within the megablock and creates a new megablock data file.

Figure 4:
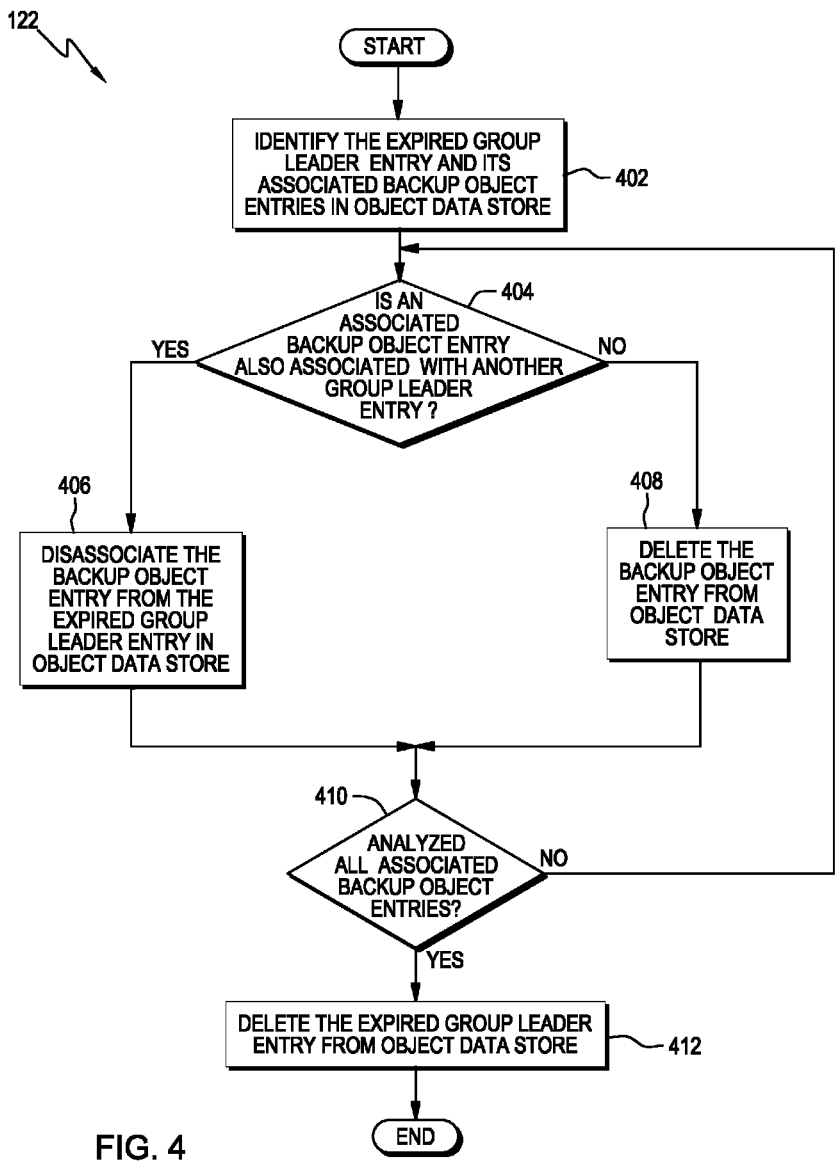
FIG. 4 is a flowchart illustrating operational steps for expiring a backup version in accordance with an embodiment of the present invention.

FIG. 4 is a flowchart illustrating operational steps that server backup program 122 performs during expiration of a backup version in accordance with an embodiment of the present invention. Expiration of a backup version can be initiated by client backup program 112, such as by user command. Expiration of a backup version can also be initiated automatically by server backup program 122 pursuant to a specified expiration policy.

In step 402, server backup program 122 accesses object data store 124 and identifies the group leader entry of the backup version to be expired ("expired group leader entry"). Server backup program 122 also identifies all backup object entries that are associated with the expired group leader entry ("associated backup object entries") using the backup object identifiers referenced in the expired group leader entry.

In step 404, server backup program 122 analyzes an associated backup object entry to determine whether the backup object entry is also associated with another group leader entry. In this exemplary embodiment, the determination is made based on whether the associated group leader field of the backup object entry contains one or more identifiers for other group leader entries.

If server backup program 122 determines that the backup object entry is also associated with another group leader entry (i.e., the backup object to which the backup object entry corresponds is needed to restore a newer backup version), then, in step 406, server backup program 122 disassociates the backup object entry from the expired group leader entry in object data store 124 by removing the identifier for the expired group leader from the associated group leader field of the backup object entry.

If, in step 404, server backup program 122 determines that the backup object entry is not associated with another group leader entry (i.e., the backup object to which the backup object entry corresponds is not needed to restore a newer backup version), then, in step 408, server backup program 122 deletes the backup object entry from object data store 124. After deleting the backup object entry from object data store 124, the corresponding backup object can be deleted from backup repository 126 (or marked for deletion).

After step 406 or step 408 is performed, analysis of the backup object entry is completed and, in step 410, server backup program 122 determines whether all associated backup object entries have been analyzed. If server backup program 122 determines that all associated backup object entries have not been analyzed, then the operational steps repeat back at step 404 for the next associated backup object entry, and so repeat for all of the associated backup object entries.

If, in step 410, server backup program 122 determines that all associated backup object entries have been analyzed, then, in step 412, server backup program 122 deletes the expired group leader entry from object data store 124.

Accordingly, expiration of a backup version is achieved with the granularity of a single backup version. Each backup version references all associated backup objects and can be expired without affecting newer backup versions that share common backup objects. Further, expiring old data does not require reading data from backup repository 126 or moving data on backup repository 126, which enables the use of sequential-access storage media in backup repository 126 and can decrease the amount of resources expended by server computing system 120 when scaling up the size of production disk 114 and backup repository 126.

The operational steps of FIGS. 2 through 4 are illustrative of one or more embodiments of the present invention. It should be understood that the content of each step, as well as the order of operation, can be modified without departing from the spirit and intended scope of the present invention.

Figure 5:
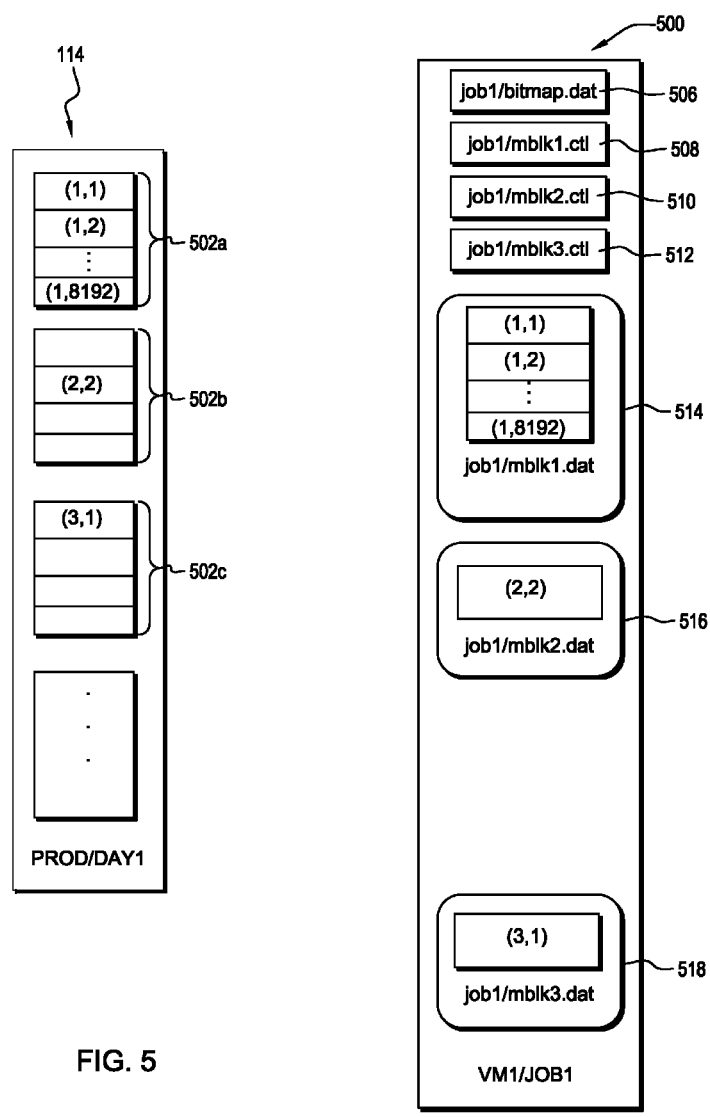
FIGS. 5 through 7 are block diagrams illustrating a series of hypothetical backup operations performed in accordance with embodiments of the present invention.
Figure 6:
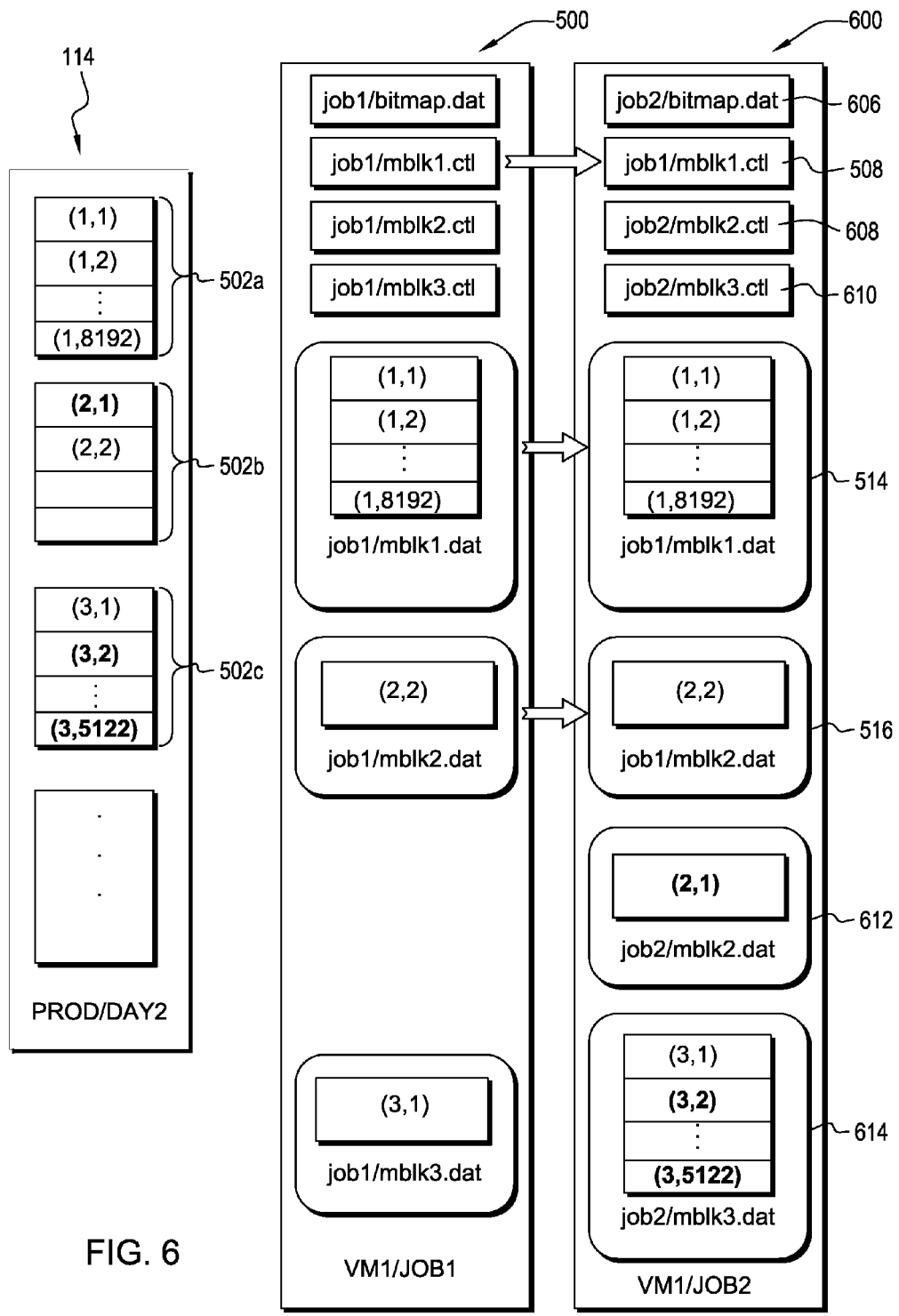
Figure 7:
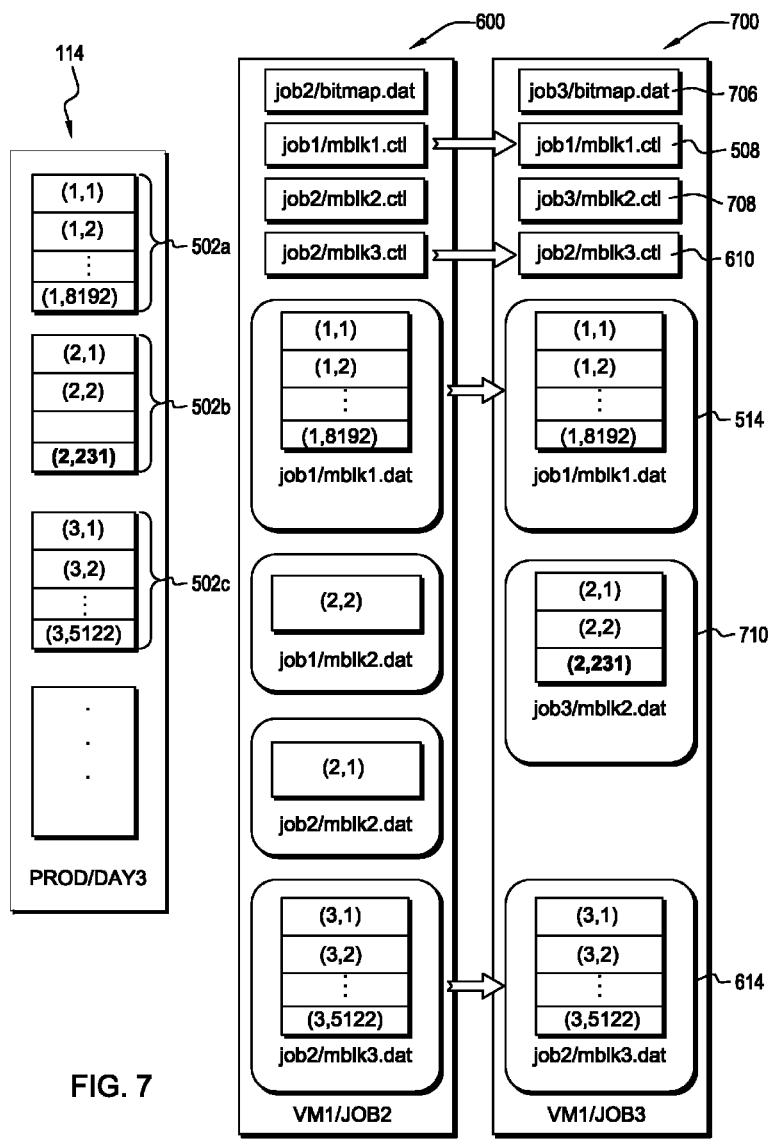
Figure 8:
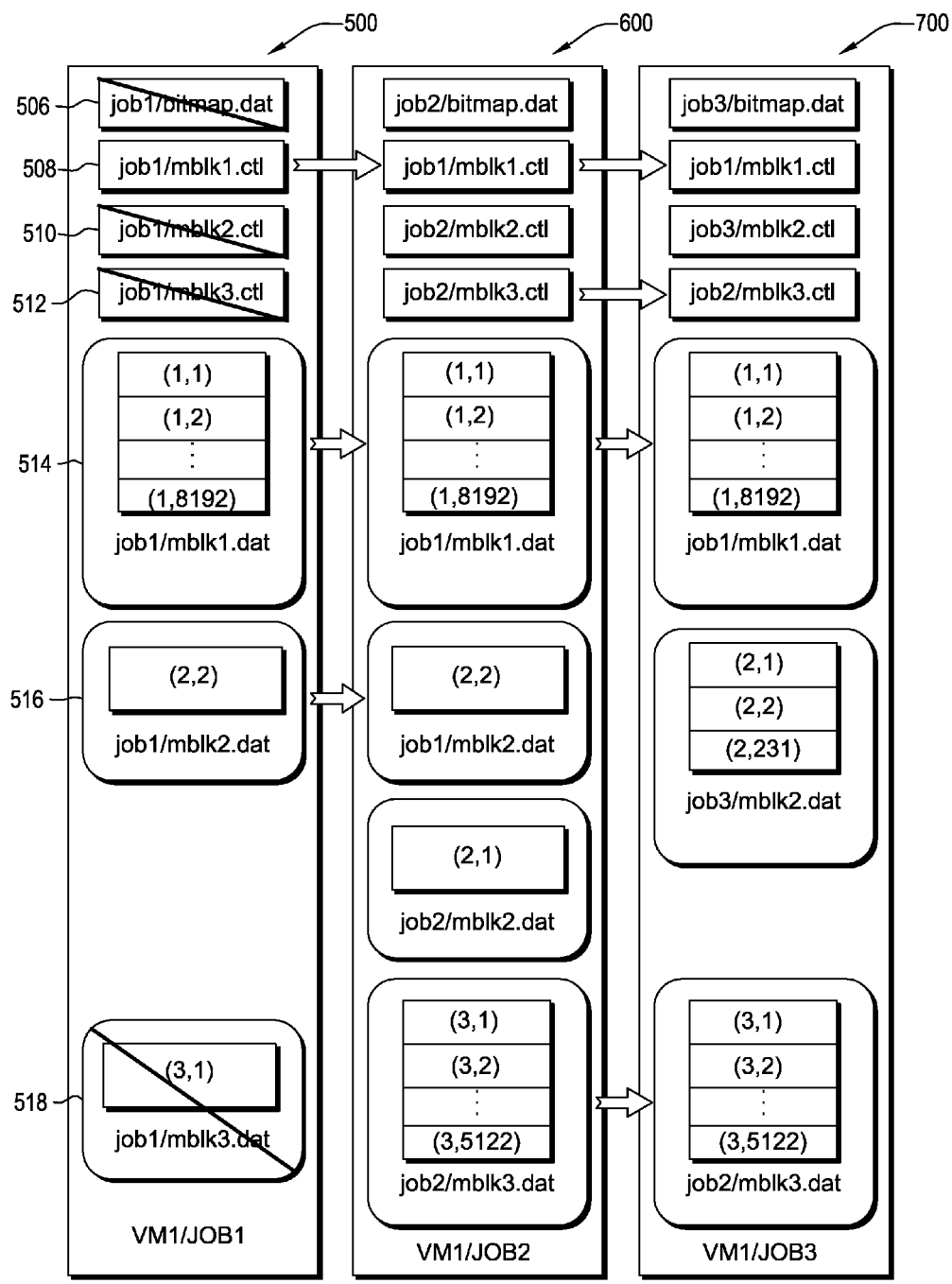
FIG. 8 is a block diagram illustrating the expiration of the backup version of FIG. 5 in accordance with an embodiment of the present invention.

FIGS. 5 through 8 are block diagrams illustrating a series of hypothetical backup operations performed in accordance with embodiments of the present invention. FIG. 5 illustrates an initial full backup of production disk 114 performed in accordance with the operational steps of FIG. 2. FIGS. 6 and 7 illustrate subsequent incremental backups performed in accordance with the operational steps of FIG. 3. FIG. 8 illustrates an expiration of the initial full backup performed in accordance with the operational steps FIG. 4. It should be understood that the examples illustrated and discussed with regard to FIGS. 5 through 8, as well as the various notations and naming schemes, are not necessarily representative of actual data that might be generated when practicing embodiments of the present invention.

Turning now to FIG. 5, shown is a block diagram of production disk 114 as it existed at the time of an initial full backup (named "PROD/DAY1"), along with a block diagram of the resulting backup version 500 (named "VM1/JOB1") after backup operations have been completed.

Production disk 114 is logically divided into megablocks and blocks. For illustrative purposes, only three megablocks will be discussed with regard to FIGS. 5 through 8: megablock 502a (i.e., megablock 1), megablock 502b (i.e., megablock 2), and megablock 502c (i.e., megablock 3). However, production disk 114 can contain many more megablocks, as indicated by the large ellipses below megablock 502c.

In this exemplary embodiment, megablocks 502a through 502c each correspond to a separate 128 megabyte region of production disk 114, and each megablock includes 8192 blocks, where each block is a 16 kilobyte region of production disk 114 that may or may not contain production data. Each block that contains production data includes a numerical notation that indicates the megablock to which the block belongs and the offset of the block within the megablock. For example, block(1,1) within megablock 502a indicates that the block belongs to megablock 502a (i.e., megablock 1) and is the first 16 kilobyte block in megablock 502a, and block (2,2) within megablock 502b indicates that the block belongs to megablock 502b (i.e., megablock 2) and is the second 16 kilobyte block in megablock 502b.

All 8192 blocks within megablock 502a contain production data: block(1,1) through block(1,8192), as indicated by the small ellipses. Only one block out of the 8192 blocks within megablock 502b contains production data: block(2,2). Similarly, only one block out of the 8192 blocks within megablock 502c contains production data: block(3,1).

Backup version 500 includes multiple backup objects whose corresponding backup object entries are associated with the group leader entry for backup version 500 in object data store 124. The backup objects, which are discussed in greater detail below, were created by client backup program 112 and transmitted to server backup program 122. Server backup program 122 stored the backup objects to backup repository 126, created backup object entries for the backup objects and a group leader entry for backup version 500 in object data store 124, and associated the backup object entries with the group leader entry for backup version 500.

In this initial full backup, client backup program 112 created a megablock data file for each megablock: megablock data file 514 (job1/mblkl.dat) contains the production data within megablock 502a; megablock data file 516 (job1/mblk2.dat) contains the production data within megablock 502b; and megablock data file 518 (job1/mblk3.dat) contains the production data within megablock 502c. For each megablock, client backup program 112 also created a control file: control file 508 (job 1/mblkl.ctl) references megablock data file 514; control file 510 (job1/mblk2.ctl) references megablock data file 516; and control file 512 (job1/mblk3.ctl) references megablock data file 518. Client backup program 112 also created bitmap file 506 (job1/bitmap.dat), which describes the overall structure of production disk 114 and references each of the control files 508 through 512.

FIG. 6 illustrates an incremental backup of production disk 114 performed in accordance with the operational steps of FIG. 3, subsequent to the initial full backup of FIG. 5. In this exemplary incremental backup, the specified maximum percentage (MaxChng) is 50 percent, and the specified maximum number of existing megablock data files (MaxNumbr) is two.

Shown is a block diagram of production disk 114 as it existed at the time of the incremental backup (named "PROD/DAY2"), along with a block diagram of the resulting backup version 600 (named "VM1/JOB2") after backup operations have been completed. As previously discussed with regard to backup version 500 of FIG. 5, backup version 600 includes multiple backup objects whose corresponding backup object entries are associated with the group leader entry for backup version 600 in object data store 124. Backup version 500 of FIG. 5 is included for comparison purposes.

Megablocks 502*a* through 502*c*, as created during the initial full backup of FIG. 5, remain the same during the incremental backup. That is, the megablocks correspond to the same regions of production disk 114, irrespective of whether the production data within those regions has changed.

Regarding megablock 502*a*, the production data has not changed since backup version 500. Thus, client backup program 112 did not create a new control file and megablock data file for megablock 502*a*; instead, client backup program 112 instructed server backup program 122 to associate the backup object entries for control file 508 and megablock data file 514 from prior backup version 500 to the new group leader entry for backup version 600 in object data store 124, as indicated with an arrow.

Regarding megablock 502*b*, new data has been written to one block: block(2,1). The percentage of changed blocks within megablock 502*b* (approximately 0.01%) is therefore less than the specified maximum percentage (50%), and the single existing megablock data file for megablock 502*b* in backup version 500 (job1/mblk2.dat) is less than the specified maximum number (two). Thus, pursuant to the specified heuristics, client backup program 112 copied only the changed block of production data within megablock 502*b* and created megablock data file 612 (job2/mblk2.dat), while the backup object entry for the existing megablock data file 516 (job1/mblk2.dat) has been associated with the new group leader entry for backup version 600 in object data store 124, as indicated with an arrow. Client backup program 112 also created control file 608, which references both megablock data file 612 (job2/mblk2.dat) and megablock data file 516 (job1/mblk2.dat).

Regarding megablock 502*c*, new data has been written to 5121 blocks: block(3,2) through block(3,5122). The percentage of changed blocks within megablock 502*c* (approximately 62.5%) therefore exceeds the specified maximum percentage (50%). Thus, pursuant to the specified heuristics, client backup program 112 copied from production disk 114 all blocks of production data within megablock 502*c* and created megablock data file 614 (job2/mblk3.dat). Client backup program 112 also created control file 610 (job2/mblk3.ctl), which references megablock data file 614 (job2/mblk3.dat), and bitmap file 606 (job2/bitmap.dat).

FIG. 7 illustrates an incremental backup of production disk 114 performed subsequent to the incremental backup discussed with regard to FIG. 6. This exemplary incremental backup involves the same specified heuristics discussed with regard to FIG. 6. Shown is a block diagram of production disk 114 as it existed at the time of the incremental backup (named "PROD/DAY3"), along with a block diagram of the resulting backup version 700 (named "VM1/JOB3") after backup operations have been completed. As previously discussed with regard to backup versions 500 and 600 of FIGS. 5 and 6, respectively, backup version 700 includes multiple backup objects whose corresponding backup object entries are associated with the group leader entry for backup version 700 in object data store 124. Backup version 600 of FIG. 6 is included for comparison purposes.

Regarding megablock 502*a*, the production data has not changed since backup version 600. Thus, client backup program 112 instructed server backup program 122 to associate the backup object entries for control file 508 and megablock data file 514 from prior backup version 600 to the new group leader entry for backup version 700 in object data store 124, as indicated with an arrow.

Regarding megablock 502*b*, new data has been written to one block: block(2,231). The percentage of changed blocks within megablock 502*b* (approximately 0.01%) is therefore less than the specified maximum percentage (50%). However, the two existing megablock data files for megablock 502*b* in prior backup version 600 (job1/mblk2.dat and job2/mblk2.dat) equal the specified maximum number (two). Thus, pursuant to the specified heuristics, client backup program 112 copied from production disk 114 all blocks of production data within megablock 502*b* and created megablock data file 710 (job3/mblk2.dat). Client backup program 112 also created control file 708 (job3/mblk2.ctl), which references megablock data file 710 (job3/mblk2.dat), and bitmap file 706 (job3/bitmap.dat).

Regarding megablock 502*c*, the production data has not changed since backup version 600. Thus, client backup program 112 instructed server backup program 122 to associate the backup object entries for control file 610 (job2/mblk3.ctl) and megablock data file 614 (job2/mblk3.dat) from prior backup version 600 to the new group leader entry for backup version 700 in object data store 124, as indicated with an arrow.

FIG. 8 illustrates an expiration of initial full backup version 500 of FIG. 5 in accordance with an embodiment of the present invention. Backup versions 600 and 700 of FIGS. 6 and 7, respectively, are shown for comparison purposes.

In this exemplary embodiment, server backup program 122 has identified the group leader entry for backup version 500 and all associated backup object entries in object data store 124. The backup object entries include the entries for bitmap file 506 (job1/bitmap.dat), control file 508 (job1/mblkl.ctl), control file 510 (job1/mblk2.ctl), control file 512 (job1/mblk3.ctl), megablock data file 514 (job1/mblk1.dat), megablock data file 516 (job1/mblk2.dat), and megablock data file 518 (job1/mblk3.dat).

Server backup program 122 has determined which of these backup object entries is also associated with a group leader entry for a newer backup version. Stated differently, server backup program 122 has determined which backup objects (i.e., to which the backup entries correspond) are needed to restore a newer backup version and therefore must be retained. As can be seen by the comparison of backup version 500 to newer backup versions 600 and 700, the following backup objects are not associated with a newer backup version: bitmap file 506, control file 510, control file 512, and megablock data file 518. Thus, server backup program 122 deleted from object data store 124 the backup object entries for each of these backup objects, as indicated with a strikethrough.

Conversely, the following backup objects are associated with a newer backup version: control file 508 (i.e., associated with backup versions 600 and 700), megablock data file 514 (i.e., associated with backup versions 600 and 700), and megablock data file 516 (i.e., associated with backup version 600). Thus, server backup program 122 did not delete the backup object entries for each of these backup objects; instead, server backup program 122 disassociated each backup object entry from the group leader entry for backup version 500. Lastly, server backup program 122 deleted from object data store 124 the group leader entry for backup version 500.

FIG. 9 is a block diagram of internal and external components of client computer system 110 and server computer system 120 in accordance with an embodiment of the present invention. It should be appreciated that FIG. 9 provides only an illustration of one implementation and does not imply any limitations with regard to the environments in which different embodiments may be implemented. Many modifications to the depicted environment may be made based on design and implementation requirements. Examples of computer systems, environments, and/or configurations that may be represented by FIG. 9 include, but are not limited to, desktop computers, laptop computers, server computers, thin clients, thick clients, multiprocessor systems, microprocessor-based systems, and distributed cloud computing environments that include any of the above systems or devices.

Client computer system 110 and server computer system 120 each include one or more buses 902, which provide for communications between one or more processors 904, memory 906, persistent storage 908, communications unit 912, and one or more input/output (IO) interfaces 914.

Memory 906 and persistent storage 908 are examples of computer-readable tangible storage media. Computer-readable tangible storage media are capable of storing information such as data, program code in functional form, and/or other suitable information on a temporary basis and/or permanent basis. One or more operating systems and client backup program 112 in client computer system 110, and one or more operating systems, server backup program 122, and object data store 124 in server computer system 120, are stored in persistent storage 908 for execution and/or access by one or more of the respective processors 904 via one or more memories of memory 906.

Memory 906 can include one or more random access memories (RAM) 916, cache memory 918, or any other suitable volatile or non-volatile storage media. Persistent storage 908 can be a magnetic disk storage medium of an internal hard drive. Alternatively, persistent storage 908 can be a semiconductor storage medium such as ROM, EPROM, flash memory or any other computer-readable tangible storage medium that can store a computer program and digital information. The storage media used for persistent storage 908 can also be removable. For example, a removable hard drive can be used for persistent storage 908. Other examples include optical or magnetic disks, thumb drives, or smart cards that are inserted into a drive for transfer onto another storage medium that is also a part of persistent storage 908.

With respect to client computer system 110, one or more production disks 114 can serve, in whole or in part, as persistent storage 908, or can be implemented separately from persistent storage 908. With respect to server computer system 120, backup repository 126 can serve, in whole or in part, as persistent storage 908, or can be implemented separately from persistent storage 908.

Communications unit 912 provides for communications with other computer systems and/or devices via network 130. The network may comprise, for example, copper wires, optical fibers, wireless transmission, routers, firewalls, switches, gateway computers, and/or edge servers. Communications unit 912 may include network adapters or interfaces such as TCP/IP adapter cards, wireless Wi-Fi interface cards, 3G or 4G wireless interface cards, or interfaces for other wired or wireless communications links. Software and data used to practice embodiments of the present invention can be downloaded from an external computer system via network 130 and communications unit 912 and can be loaded onto persistent storage 908.

One or more I/O interfaces 914 allow for input and output of data with other devices that may be connected to client computer system 110 and/or server computer system 120. For example, I/O interfaces 914 can provide a connection to one or more external devices 920 and display 922. External devices 920 can include, for example, a keyboard, computer mouse, touch screen, and other human interface devices. External devices 920 can also include portable computer-readable tangible storage media such as, for example, thumb drives, portable optical or magnetic disks, and memory cards. Software and data used to practice embodiments of the present invention can be stored on such portable storage media and can be loaded onto persistent storage 908. With respect to client computer system 110, external devices 920 can also include one or more production disks 114. With respect to server computer system 120, external devices 920 can also include backup repository 126.

Display 922 provides a mechanism to display data to a user and can be, for example, a computer monitor. Alternatively, display 922 can be an incorporated display that also functions as an input device, such as, for example, a display that also functions as a touch screen.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "system." Furthermore, aspects of the present invention may take the form of a computer program product embodied in one or more computer-readable tangible storage media having computer-readable program instructions embodied thereon.

It will be understood that each block of the flowchart illustrations and/or block diagrams, and combinations of blocks in the flowchart illustrations and/or block diagrams, can be implemented by computer instructions. These computer instructions may be provided to a processor of a computer system such as a general purpose computer, special purpose computer, or other programmable data processing apparatus to produce a machine, such that instructions, which execute via the processor of the computer system or other programmable data processing apparatus, create means for implementing the functions/acts specified in the flowchart and/or block diagram blocks.

The aforementioned programs can be written in any combination of one or more programming languages, including, for example, low-level, high-level, object-oriented or non object-oriented languages, such as Java®, Smalltalk, C, and C++. The program code may execute entirely on a user's computer system, partly on a user's computer system, as a stand-alone software package, partly on a user's computer system and partly on a remote computer system, or entirely on a remote computer system or server. In the latter scenario, the remote computer system may be connected to the user's computer system through any type of network, including a local area network (LAN) or a wide area network (WAN), or the connection may be made to an external computer (for example, through the Internet using an Internet service provider). Alternatively, the functions of the aforementioned programs can be implemented in whole or in part by computer circuits and other hardware.

The foregoing description of various embodiments of the present invention has been presented for purposes of illustration and description. It is not intended to be exhaustive nor limit the invention to the precise form disclosed. Many modifications and variations of the present invention are possible. Such modifications and variations that may be apparent to a person skilled in the art of the invention are intended to be included within the scope of the invention as defined by the accompanying claims.

What is claimed is:

1. A method comprising:
   generating a first incremental backup group by backing up block(s) of data stored on one, or more, production disks to a backup repository, the first incremental backup group including a set of backup objects, each backup object of the set of backup objects identified by a corresponding backup object entry and assigned to pre-defined logical region of the one, or more, production disks, at least one of the backup objects of the set of backup objects being one or more blocks of data of the block(s) of data;
   generating a plurality of subsequent incremental backup groups, each subsequent incremental backup group generated by: (i) determining a set of changed block(s) of data that have changed since generating a most recent prior incremental backup group, (ii) backing up the set of changed block(s) of data as one or more new backup objects assigned to one or more pre-defined logical regions, (iii) identifying the or more new backup objects with corresponding backup object entries, and (iv) providing a set of backup object entries respectively corresponding to each backup object corresponding to one or more unchanged blocks of data stored on the one, or more, production disks;
   responsive determining an expiration trigger for an expiring incremental backup group, identifying a first backup object represented by a first backup object entry in the set of backup entries, the first backup object assigned to a first logical region of the one, or more, production disks;
   backing up the first logical region of the one, or more, production disks as a new backup object corresponding to a most recent incremental backup group, the new backup object represented by a most recent backup object entry of the most recent incremental backup group;
   analyzing a set of backup object entries of the most recent incremental backup group to determine whether any unexpired incremental backup group is not represented by corresponding backup object in the set of backup object entries; and
   responsive to determining that no backup object of an unexpired incremental backup group is represented by the set of backup object entries of the most recent prior incremental backup group, expiring the unexpired incremental backup group;
   wherein:
   the set of backup object entries contains a storage location of each backup object in the backup repository that is needed to restore a most recent set of block(s) of data of the one, or more, production disks.

2. The method of claim 1, wherein generating a first incremental backup group includes:
   associating the set of backup objects with a first group leader in a block-level incremental-forever backup system;
   wherein:
   each of the backup objects in the set of backup objects and the first group leader are identified by a bitmap file; and
   the first group leader is recorded in an associated group leader entry field of a corresponding set of backup object entries.

3. The method of claim 1, wherein the set of backup objects further includes: a set of control files, and a bitmap file.

4. The method of claim 3, wherein:
   each control file of the set of control files respectively describes the structure of corresponding block(s) of data in the set of backup objects; and
   the bitmap file includes a bitmap record for each control file.

5. The method of claim 2, wherein:
   a set of group leaders respectively corresponds to a full backup of the one, or more, production disks; and
   each group leader of the set of group leaders corresponds to a subset of backup objects of a respective incremental backup group.

6. The method of claim 2, wherein:
   each backup object entry also contains an identifier of the backup object entry;
   an first group leader is associated with each backup object in the set of backup objects; and
   expiring the initial backup data set includes deleting an initial group leader identification from the associated group leader entry field of a corresponding backup object entry.

7. A computer program product comprising a computer readable storage device having stored thereon:
   first program instructions programmed to generate a first incremental backup group by backing up block(s) of data stored on one, or more, production disks to a backup repository, the first incremental backup group including a set of backup objects, each backup object of the set of backup objects identified by a corresponding backup object entry and assigned to a pre-defined logical region of the one, or more, production disks, at least one of the backup objects of the set of backup objects being one or more blocks of data of the block(s) of data;
   second program instructions programmed to generate a plurality of subsequent incremental backup groups, each subsequent incremental backup group generated by: (i) determining a set of changed block(s) of data that have changed since generating a most recent prior incremental backup group, (ii) backing up the set of changed block(s) of data as one or more new backup objects assigned to one or more pre-defined logical regions, (iii) identifying the one or more new backup objects with corresponding backup object entries, and (iv) providing a set of backup object entries respectively corresponding to each backup object corresponding to one or more unchanged blocks of data stored on the one, or more, production disks;

third program instructions programmed to, responsive to determining an expiration trigger for an expiring incremental backup group, identify a first backup object represented by a first backup object entry in the set of backup object entries, the first backup object assigned to a first logical region of the one, or more, production disks;

fourth program instructions programmed to back up the first logical region of the one, or more, production disks as a new backup object corresponding to a most recent incremental backup group, the new backup object represented by a most recent backup object entry of the most recent incremental backup group;

fifth program instructions programmed to analyze a set of backup object entries of a most recent prior incremental backup group to determine whether any unexpired incremental backup group is not represented by a corresponding backup object in the set of backup object entries; and sixth program instructions programmed to, responsive to determining that no backup object of an unexpired incremental backup group is represented by the set of backup object entries of the most recent prior incremental backup group, expire the unexpired incremental backup group;

wherein:

the set of backup object entries contains a storage location of each backup object in the backup repository that is needed to restore a most recent set of block(s) of data of the one, or more, production disks.

8. The computer program product of claim 7, wherein first program instructions programmed to generate a first incremental backup group includes:

program instructsions to associate the set of backup objects with a first group leader in a block-level incremental-forever backup system;

wherein:

each of the backup objects in the set of backup objects and the first group leader are identified by a bitmap file ;and the first group leader is recorded in an associated group leader entry field of a corresponding set of backup object entries.

9. The computer program product of claim 7, wherein the set of backup objects further includes: a set of control files, and a bitmap file.

10. The computer program product of claim 8, wherein:

a set of group leaders respectively corresponds to a full backup of the one, or more, production disks; and each group leader of the set of group leaders corresponds to a subset of backup objects of a respective incremental backup version.

11. A computer system comprising:

a processor(s) set; and a computer readable storage medium;

wherein:

the processor set is structured, located, connected and/or programmed to run program instructions stored on the computer readable storage medium; and the program instructions include:

first program instructions programmed to generate a first incremental backup group by backing up block(s) of data stored on one, or more, production disks to a backup repository, the first incremental backup group including a set of backup objects, each backup object of the set of backup objects identified by a corresponding backup object entry and assigned to a pre-defined logical region of the one, or more, production disks, at least one of the backup objects of the set of backup objects being one or more blocks of data of the block(s) of data;

second program instructions programmed to generate a plurality of subsequent incremental backup groups, each subsequent incremental backup group generated by: (i) determining a set of changed block(s) of data that have changed since generating a most recent prior incremental backup group, (ii) backing up the set of changed block(s) of data as one or more new backup objects assigned to one or more pre-defined logical regions, (iii) identifying the one or more new backup objects with corresponding backup object entries, and (iv) providing a set of backup object entries respectively corresponding to each backup object corresponding to one or more unchanged blocks of data stored on the one, or more, production disks;

third program instructions programmed to, responsive to determining an expiration trigger for an expiring incremental backup group, identify a first backup object represented by a first backup object entry in the set of backup object entries, the first backup object assigned to a first logical region of the one, or more, production disks;

fourth program instructions programmed to back up the first logical region of the one, or more, production disks as a new backup object corresponding to a most recent incremental backup group, the new backup object represented by a most recent backup object entry of the most recent incremental backup group;

fifth program instructions programmed to analyze a set of backup object entries of a most recent prior incremental backup group to determine whether any unexpired incremental backup group is not represented by a corresponding backup object in the set of backup object entries; and sixth program instructions programmed to, responsive to determining that no backup object of an unexpired incremental backup group is represented by the set of backup object entries of the most recent prior incremental backup group, expire the unexpired incremental backup group;

wherein:

the set of backup object entries contains a storage location of each backup object in the backup repository that is needed to restore a most recent set of block(s) of data of the one, or more, production disks.

12. The computer system of claim 11, wherein first program instructions programmed to generate a first incremental backup group includes:

program instructsions to associate the set of backup objects with a first group leader in a block-level incremental-forever backup system;

wherein:

each of the backup objects in the set of backup objects and the first group leader are identified by a bitmap file; and the first group leader is recorded in an associated group leader entry field of a corresponding set of backup object entries.

13. The computer system of claim 11, wherein the set of backup objects further includes: a set of control files, and a bitmap file.

14. The computer system of claim 13, wherein:
each control file of the set of control files respectively describes the structure of corresponding block(s) of data in the set of backup objects; and
the bitmap file includes a bitmap record for each control file.

15. The computer system of claim 12, wherein:
a set of group leaders respectively corresponds to a full backup of the one, or more, production disks; and
each group leader of the set of group leaders corresponds to a subset of backup objects of a respective incremental backup group.

* * * * *